United States Patent
Ries

(10) Patent No.: US 9,758,245 B2
(45) Date of Patent: Sep. 12, 2017

(54) ROTOR DRIVE SYSTEM

(71) Applicant: AIRBUS HELICOPTERS DEUTSCHLAND GMBH, Donauworth (DE)

(72) Inventor: Tobias Ries, Nordendorf (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 458 days.

(21) Appl. No.: 14/300,533

(22) Filed: Jun. 10, 2014

(65) Prior Publication Data

US 2015/0225078 A1  Aug. 13, 2015

(30) Foreign Application Priority Data

Jul. 2, 2013  (EP) .................................... 13400014

(51) Int. Cl.
*B64C 27/72* (2006.01)
*B64C 27/12* (2006.01)
*B64C 27/82* (2006.01)

(52) U.S. Cl.
CPC .............. *B64C 27/72* (2013.01); *B64C 27/12* (2013.01); *B64C 27/82* (2013.01); *B64C 2027/8254* (2013.01)

(58) Field of Classification Search
CPC ......... B64C 27/72; B64C 27/78; B64C 27/80; B64C 27/82; B64C 2027/7205;
(Continued)

(56) References Cited

U.S. PATENT DOCUMENTS 3,708,251 A * 1/1973 Pierro .................... B63H 5/125
                                                310/263
4,905,932 A * 3/1990 Piasecki ................. B64C 27/82
                                                244/17.19
(Continued)

FOREIGN PATENT DOCUMENTS

AU  WO 2005100154 A1 * 10/2005 ........... B64C 13/503
CA        2794077          6/2013
(Continued)

OTHER PUBLICATIONS

Extended European Search Report for EP 13400014.0, Completed by the European Patent Office, Dated Dec. 13, 2013, 4 Pages.

*Primary Examiner* — Woody Lee, Jr.
*Assistant Examiner* — Eric Zamora Alvarez
(74) *Attorney, Agent, or Firm* — Brooks Kushman P.C.

(57) ABSTRACT

A rotor drive for a tail rotor of a helicopter is provided. The system includes a stator and a rotor mounted to the stator with a rotatable central carrier. Rotor blades are radially attached to the rotatable central carrier and each of the rotor blades is pivotable about their respective radial central axis for variation of blade pitch. At least one permanent magnet is provided on each rotor blade. A plurality of electromagnets is provided on the stator close enough to allow inductive interaction between the plurality of electromagnets and the at least one permanent magnet on each rotor blade. The permanent magnets are offset from the radial central axis in a direction perpendicular to the rotation plane for individual pitch control of the rotor blades by individual control of electric supply to the electromagnets.

15 Claims, 7 Drawing Sheets

(58) Field of Classification Search
CPC .... B64C 2027/7277; B64C 2027/8209; B64C 2027/8254; B64C 11/44; B64C 11/301; B63H 3/00; B63H 3/002; B63H 3/06; F03D 7/0224; F01D 7/00
USPC .................................. 416/3, 147, 155, 159
See application file for complete search history.

(56) References Cited

U.S. PATENT DOCUMENTS

| | | | | |
|---|---|---|---|---|
| 4,953,811 | A | 9/1990 | Smith | |
| 5,282,719 | A * | 2/1994 | McCarty | B64C 11/32 416/1 |
| 5,967,749 | A * | 10/1999 | Eaves | B63H 3/06 416/155 |
| 6,322,324 | B1 * | 11/2001 | Kennedy | B64C 27/001 244/17.13 |
| 6,354,536 | B1 * | 3/2002 | Torok | B64C 27/605 244/39 |
| 7,048,506 | B2 * | 5/2006 | Atmur | B63G 8/16 416/155 |
| 7,448,854 | B2 * | 11/2008 | Jolly | B64C 27/001 415/119 |
| 7,926,763 | B2 * | 4/2011 | Froman | B64D 15/12 244/134 A |
| 8,029,233 | B2 * | 10/2011 | Hoffmann | F03D 17/00 415/118 |
| 8,915,710 | B2 * | 12/2014 | Chaudhry | B64C 27/615 416/23 |
| 2004/0198136 | A1 | 10/2004 | Vogel | |
| 2005/0082839 | A1 * | 4/2005 | McCoin | F03D 1/025 290/55 |
| 2006/0049304 | A1 | 3/2006 | Sanders, Jr. et al. | |
| 2009/0140095 | A1 | 6/2009 | Sirohi et al. | |
| 2012/0051907 | A1 | 3/2012 | Rogers et al. | |
| 2013/0243598 | A1 | 9/2013 | Ziegler et al. | |

FOREIGN PATENT DOCUMENTS

| | | |
|---|---|---|
| DE | 20315369 | 12/2003 |
| EP | 2106998 | 10/2009 |
| EP | 2570662 A2 | 3/2013 |
| EP | 2570662 A3 | 6/2013 |
| GB | 2360752 | 10/2001 |
| JP | 2011006041 | 1/2011 |
| WO | 02096752 | 12/2002 |
| WO | 2009129309 | 10/2009 |

* cited by examiner

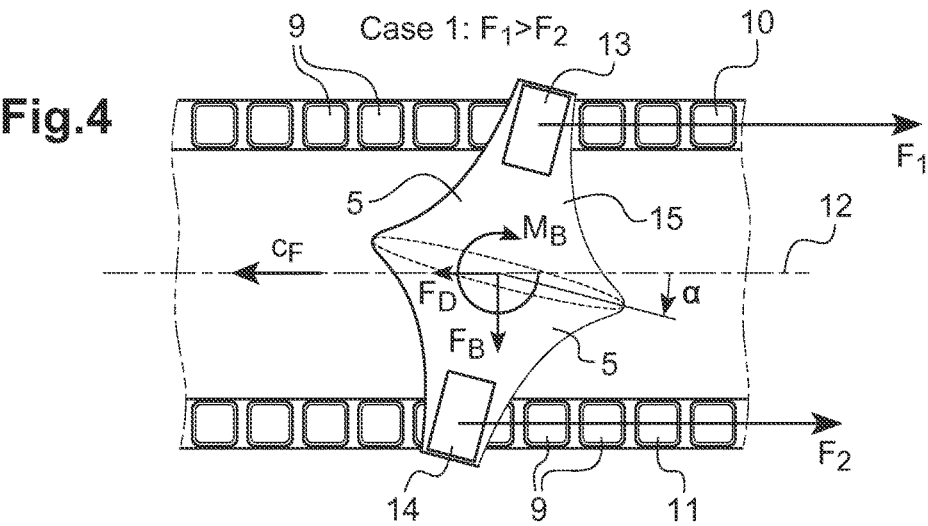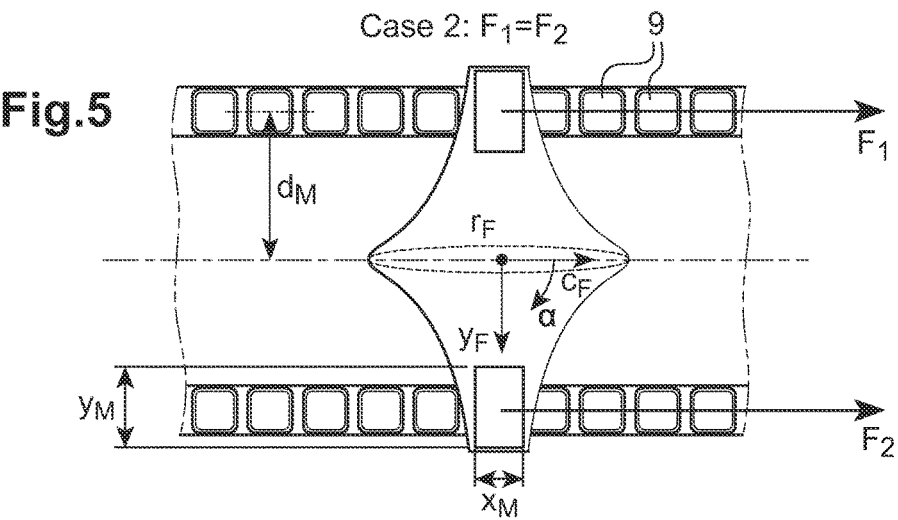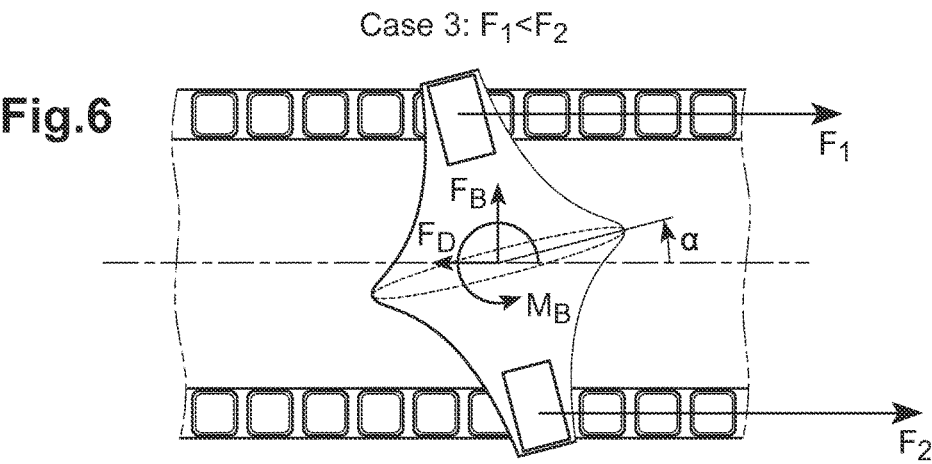

ROTOR DRIVE SYSTEM

CROSS REFERENCE TO RELATED APPLICATION

This application claims priority to European patent application No. EP 13 400014.0 filed on Jul. 2, 2013, the disclosure of which is incorporated in its entirety by reference herein.

BACKGROUND OF THE INVENTION (1) Field of the Invention

The invention relates to a rotor drive system, particularly a rotor drive system of a tail rotor of a helicopter with the features of the preamble of claim 1.

In order to balance the reactive torque of a main rotor, it is known to provide helicopters with a tail rotor, driven and located in a duct, i.e. in a so called fenestron.

(2) Description of Related Art

Rotating thrust systems with blades controlled by a variable rotational speed instead of a variable pitch rate suffer of the problems of high torque moments and low thrust change rates, especially in the area of low rotational velocities. On the other side, thrust systems with a constant rotational speed and variable pitch often cannot lower the rotational speed or change the direction of rotation.

The document US 2009/140095 A1 discloses a rotary-wing aircraft with an electric motor mounted along an axis of rotation to drive a rotor system about the axis of rotation.

The document WO 02/096752 A1 discloses an electromagnetic drive system arranged within a hub area and having a frictionless/non-contacting electromagnetic support of rotor blades.

The document JP 2011006041 discloses an electrical tail rotor with motor located in a hub having rotary blades.

Individual blade pitch control of turbines in wind farms is known from the document US 2012/0051907.

The document US 2006/049304 A1 discloses a hover aircraft with an air impeller engine having an air channel duct and a rotor with outer ends of its blades fixed to an annular impeller disk that is driven by magnetic induction elements arrayed in the air channel duct. The air-impeller engine is arranged vertically in the aircraft frame to provide vertical thrust for vertical take-off and landing. The air-impeller engine employs dual, coaxial, contra-rotating rotors for increased thrust and gyroscopic stability. An air vane assembly directs a portion of the air thrust output at a desired angle to provide a horizontal thrust component for flight manoeuvring or translation movement. Electric power is supplied to the magnetic induction drives by high-capacity lightweight batteries or fuel cells.

According to the document WO 2009/129309 A2 a wind generator is disclosed in which superconducting ring generators are utilized without the need for a load bearing drive shaft and other mechanical components.

The document GB 2360752 A discloses a ducted fan arrangement used for a helicopter's torque correction, with a variable blade pitch control. The pitch control of the fan is realized by a hard coupling to the main rotors collective control. An electrical generator in the ducted fan supplies current to the helicopter's electrical control and distribution system.

The document U.S. Pat. No. 4,953,811 A discloses a helicopter with an electrical powered tail rotor in a shroud. At least one permanent magnet energized synchronous motor with an increased pole number drives the tail rotor. Said at least one synchronous motor is integrated as a torus around an opening of the shroud encompassing the tail rotor. Blades of the tail rotor are fixed to at least one rotating component.

Until now, the anti-torque thrust system of helicopters is usually operating at a constant rotational speed and the change in thrust is usually generated by a variable rotor blade pitch. A thrust system where a change of thrust is generated by changing the blade pitch has several advantages compared to a thrust system where the rotational speed is changed. The change in thrust can be set very fast, just limited by the pitch change rate of the blades while the thrust change by a change in rotational speed is usually much slower due to the required acceleration and deceleration of the rotor. A thrust change by variable pitch causes just low changes in the torque of the rotational axis in contrast to a thrust change by a variable rotational speed, where the whole rotor mass needs to be accelerated, leading to a high rotor torque. This is not just of advantage for the power requirement of the driving system, but also for the moment equilibrium of a helicopter or any other system where the thrust system is built in. A thrust system which combines the two features, variable rotational speed and variable pitch is usually more complex because in addition to a drive which allows a variable rotational speed, also a system for changing the pitch needs to be built in. This increased complexity makes such a concept more expensive and heavy.

BRIEF SUMMARY OF THE INVENTION

It is an object of the invention to provide an improved rotor drive system, improve reaction times of said rotor drive system and to increase the degrees of freedom of such a rotor drive system. It is a further object of the invention to improve the vibration control and sound control of such a rotor drive system, particularly for a rotor drive system as a ducted fan for generating anti-torque for a helicopter at variable rotational speeds.

According to the invention a rotor drive system, particularly a rotor drive system of a tail rotor of a helicopter, comprises a stator and a rotor. Said rotor is mounted to the stator with a rotatable central carrier and rotor blades are radially attached to said rotatable central carrier. Said rotor blades define a rotation plane with their radial central axes said rotation plane being essentially perpendicular to an axis of rotation of the rotor. Each of said rotor blades is pivotable about their respective radial central axis for variation of blade pitch.

Drive means and pitch control means are provided for said rotor. Along at least one blade radius on said rotor blades at least one permanent magnet is provided on each rotor blade and a plurality of electromagnets on the stator are provided coaxially on at least one stator radius close enough to said at least one blade radius to allow inductive interaction between said electromagnets on the stator and said at least one permanent magnet on each rotor blade. Said permanent magnets are fixed to the respective rotor blades, offset from the radial central axis in direction of the axis of rotation of the rotor, for individual pitch control of said rotor blades by individual control of the electromagnets individually connected to electric supply means.

An inventive rotor drive system comprises a central carrier as a hub with one preferably electrical hub motor as drive means providing power to the rotor while the individually controllable electromagnets on the stator and said at least one permanent magnet on each rotor blade mainly provide the pitch control for the twist of the respective rotor blades individually controllable by control units. The inventive rotor drive system allows control of the blade pitch by a single system.

The inventive rotor drive system further allows additional degrees of freedom by moment generation about the axes perpendicular to the rotors rotational axis and in the direction of the axis of rotation of the rotor. The inventive rotor drive system also allows individual high frequency pitch change for the respective rotor blades. The electromagnets on the stator and said at least one permanent magnet on each rotor blade can be mounted for example on a radius corresponding to the connection between the rotor blades and flex-beams fixing the rotor blades to the central carrier. In this case the at least one ring of electromagnets must be mounted on an additional support ring as stator allowing the use of this invention for conventional, unshrouded tail rotors or even main rotors of helicopters.

According to a preferred embodiment of the invention the stator is a ducted fan and the rotor is mounted on the central carrier radially inside the ducted fan. According to this advantageous embodiment of the invention in ducted fan rotors, the at least one ring of electromagnets can be mounted on the duct so that no additional support ring as stator is required.

Each of said rotor blades of the rotor is provided with two electrically separated permanent magnets at a tip of each rotor blade and each of said two permanent magnets is fixed offset from the radial central axis in direction of the axis of rotation of the rotor on opposed sides to the rotation plane.

The electromagnets are provided along two coaxial, electrically separate rings on an inner circumference of the ducted fan next to the tips with one of said separate rings being sufficiently close to said permanent magnets on one of said two opposed sides and the other one of said separate rings being sufficiently close to said permanent magnets on the other one of said two opposed sides to the rotation plane to allow electrically separate induction of said permanent magnets on both of the opposed sides of each rotor blade.

An advantage of the invention is the provision of pitch control means for the rotor blades individually for each rotor blade for any position of the rotor blade along its circular path. No separate systems for generating variable rotation speed of the entire rotor and pitch control of the individual blades are required. The inventive rotor drive system allows a combination of electromagnets provided along one ring with said permanent magnets offset on one and the same side or electromagnets provided along two coaxial, electrically separate rings with associated permanent magnets offset on either sides as outer motors/generators in the ducted fan with one hub motor providing additional power.

The outer motor(s)/generators would provide differentiated power for the twist of the rotor blades whilst the hub motor would provide power to drive the rotor. The motors of the inventive rotor drive system are preferably electrically driven. If the rotor of the inventive rotor drive system is driven mechanically, the preferably electrical outer motors for pitch control of the rotor blades with additional degrees of freedom like $M_{xF}$, $M_{yF}$ and $M_{zF}$ moment generation, $F_x$ and $F_z$ force generation and high frequency pitch change could as well be controlled as a coupled Generator-Motor-System, so that e.g. the electromagnets on the stator and said at least one permanent magnet on each rotor blade act as a generator fed by the energy of the hub motor with both outer motors contributing to the required pitch moment generation as pitch control means for controlled pitch change of the rotor blade.

When both outer electrical motors of the inventive rotor drive system act as generators supplying power to an electrical grid of e.g. a helicopter, existing generators on board the helicopter would be obsolete. In this case, for a pitch change, just the electricity generation balance between both outer electric generators of the inventive rotor drive system would need to be adjusted, which can be done by motor control units.

According to a further preferred embodiment of the invention the ducted fan of the inventive rotor drive system provides anti-torque, particularly like a ducted tail rotor of a helicopter in a shroud. The drive means for said rotor are the electromagnets of the two separate rings on the inner circumference of the ducted fan interacting with said permanent magnets on both of the opposed sides of each rotor blade to operate as electrically separated motors.

Assuming no aerodynamic pitch moments about the pitch axis of the blades when both outer motors of the inventive rotor drive system provide the same power forces $F_1$ and $F_2$ generated by the motor are equal. When the two motors provide different amounts of power, a moment $M_B$ is generated in the blades central axis, allowing individual pitch changes $\Delta\alpha$ of each individually driven rotor blade for $F_1 > F_2$ and for $F_1 < F_2$. The amount of respective individual pitch changes $\Delta\alpha$ is determined by the applied moment and the torsional stiffness of the rotational ball bearing support for pitch with a torsional spring or by the torsional stiffness of the flex-beam on which the blade is mounted. Aerodynamic pitch moments are taken into account as well by a motor control or particularly an active motor control system of said drive means and pitch control means.

The inventive rotor drive system in a ducted fan allows reduced rotational speeds independent from the speed of the main rotor with the advantage that the noise generated at lower thrust with lower rotational speeds is usually lower than at a system with a constant, high rotational speed. Supply means are provided separately to each of said electro magnets of said at least two motors.

Consequently an advantage of the inventive rotor drive system in a ducted fan is that the blade pitch of the rotor blades can be controlled individually by the electro magnets of the two rings, providing a force difference at the permanent magnets on opposed sides individually for each blade. The inventive system also provides additional redundancy, because it is still operable if one of the two outer motors/generators or individual electromagnets fail.

All together the inventive rotor drive system provides the following advantages:

Combined advantages of rotors with variable rotational speed and variable pitch with a single drive/control unit;

No additional complexity by using the same drive system for rotation and pitch;

The inventive rotor drive system can be switched off;

The inventive rotor drive system provides variable rotational speed in both turn-directions;

The inventive rotor drive system is therefore more energy efficient compared to state of the art systems;

The inventive rotor drive system is therefore in most cases more silent and in no case noisier;

The inventive rotor drive system provides variable pitch;

The inventive rotor drive system can provide very fast changes in thrust, even faster than conventional systems with variable pitch;

The inventive rotor drive system allows individual control of the pitch angle of each blade to:

Generate moments $M_{xF}$ and $M_{zF}$ in the axes $x_{HC}$ and $z_{HC}$ perpendicular to the rotors rotational axis $y_F$ which provides two additional degrees of freedom compared to the collective variable pitch systems of the state of the art.

Generate a controllable moment $M_{yF}$ in the rotational axis of the rotor by pitching over the circumference respectively two blades constantly in opposite directions ±α to generate a circumferential drag force $F_D$ opposite to the rotational direction of the rotor and consequently a moment $M_{yF}$, but in total no resulting thrust $\Delta F_y$.

Generate forces in $x_{HC}$ and $z_{HC}$ direction by drag generation in circumferential direction at just a part of the rotor azimuth for $F_x$ and for $F_z$. The generation of drag forces always leads also to the generation of a moment $M_{yF}$. Alternatively forces $F_x$ and/or $F_z$ in $x_{HC}$ and $z_{HC}$ direction can be generated by the superposition of a moment generation $M_{xF}$ and/or $M_{zF}$ perpendicular to the rotors rotational axis $y_{Hc}$ with an anti-torque-thrust $F_y$. One half of the rotor creates a high thrust in one direction, while the other half creates a low thrust, e.g. in the other direction. The low thrust flow interacts with the high thrust flow to redirect the high thrust flow, resulting in total in a force $F_x$ in $x_{HC}$-direction and/or $F_z$ in $z_{HC}$-direction. Again a moment $M_{yF}$ is generated by the drag in circumferential direction supplemental to the desired force $F_x$ or $F_z$.

Use the fan as a vibration control system

Reduce or modify the noise caused by the fan

The inventive rotor drive system allows redundancy if one of the motors or some of the electromagnets fail.

Due to the instantaneous force changes made possible by the high control frequency of the electromagnets, the pitch can be changed much faster compared to conventional systems. In combination with the individual pitch control and the variable rotational speed, this opens a wide field of possibilities for its use in the flight control, stabilization, sound control and anti-vibration system of a helicopter.

The rotational speed of the inventive rotor drive system can be adjusted continuously. This can be used to lower the maximum thrust level and the power consumption in flight states when a maximum thrust level is not required. The inventive rotor drive system allows, when it is not required, to hold the rotor blades in a constant position and to still actively control the blade pitch in this situation. In a system without or with a very small shroud, where the rotor blades are still partly, or fully exposed to a free air stream, the pitch control of the non-rotating blades could be used to let the non-rotating blades act like a rudder.

BRIEF DESCRIPTION OF THE SEVERAL VIEWS OF THE DRAWINGS

Preferred embodiments of the invention are presented by means of the following description with reference to the attached drawings, from which In FIG. 1 a lateral view of a tail rotor of a rotor drive system according to the invention is shown, In FIG. 2 a cross-section A-A of FIG. 1 is shown, In FIG. 3 a cross-section A-A is shown of a further rotor drive system according to the invention, In FIG. 4 a rotor blade with a positive pitch angle α in a projection of a part of the rotor drive system according to the invention is shown, In FIG. 5 a rotor blade with a pitch angle α=0° in a projection of said part of the rotor drive system according to the invention is shown, In FIG. 6 a rotor blade with a negative pitch angle α in a projection of said part of the rotor drive system according to the invention is shown, In FIG. 7-FIG. 12 different blade pitches α over one rotor revolution are shown with their respectively resulting forces and moments, In FIG. 13 a rotor blade in a further modified rotor drive system according to the invention is shown.

DETAILED DESCRIPTION OF THE INVENTION

Two coordinate systems are used throughout the description:

A first coordinate system with the coordinates $x_{HC}$, $y_{HC}$ and $z_{HC}$ is cartesian with a helicopter's frame as reference. The $x_{HC}$-axis is pointing towards the front of the helicopter in forward flight direction. The $y_{HC}$-axis is pointing to the right of the helicopter clockwise in forward flight direction. The $z_{HC}$-axis completes the right hand system by pointing down towards a bottom of the helicopter. The second coordinate system is a rotor fixed polar coordinate system inherent to any individual rotor blade of the rotor drive system. Relative to the helicopter's frame of reference the second system rotates with the rotational speed of the rotor about an axis of rotation $y_F$ which is parallel to $y_{HC}$. Each rotor blade possesses its own second coordinate system. It is defined by the radial axis r of the rotor blade pointing from the rotor hub centre to the tip center of the rotor blade and the circumferential coordinate $c_F$, within the rotational plane of the rotor. A revolution angle ψ describes an angular position of the rotor blade of the rotor drive system with regard to the helicopter's frame of reference. The rotation of the rotor blade around the radial axis r by the pitch angle α (i.e. FIG. 6) completes the second coordinate system.

Figure 1:
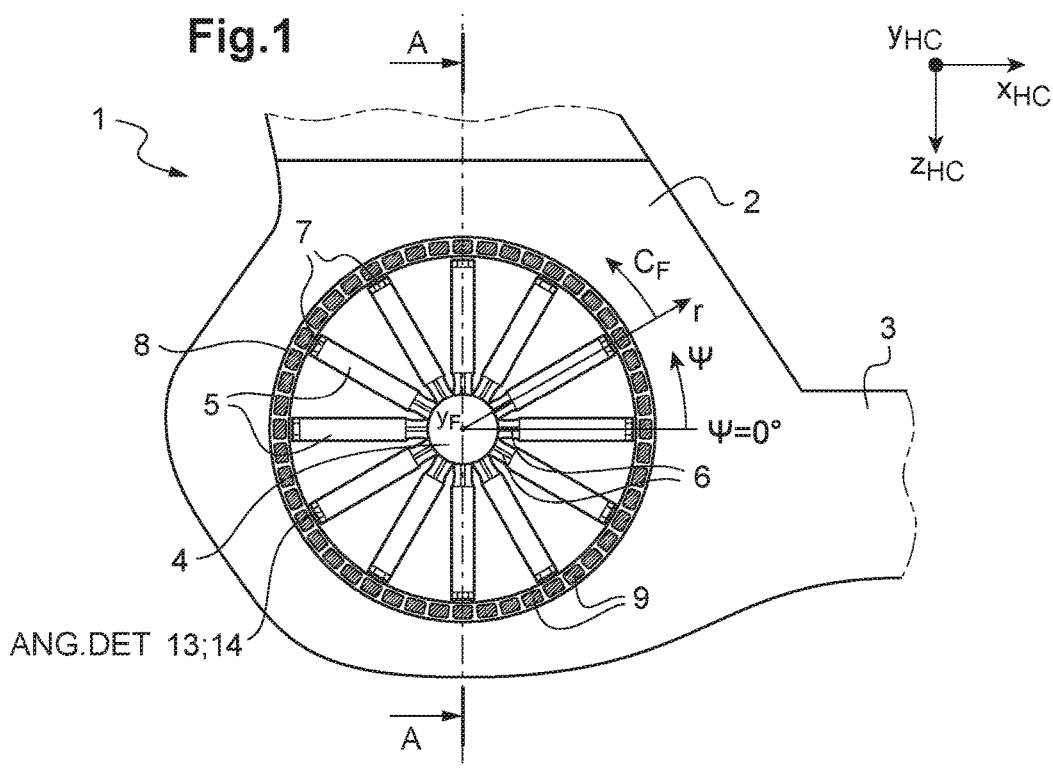

According to FIG. 1 a rotor drive system 1 in a ducted fan as an anti-torque system, e.g. an electrical Fenestron, is mounted into a shroud 2 connected to a tail boom 3 of a helicopter (not shown). The shroud 2 is constructed as a circular open stator. Inside the shroud 2 is a rotor with a rotatable central carrier 4 and a plurality of rotor blades 5, i.e. twelve rotor blades 5, distributed around the central carrier 4 in essentially one plane perpendicular to the axis of rotation $y_F$ of the rotatable central carrier 4 and rotatable with the central carrier 4 around said axis of rotation $y_F$. The rotor is mounted by means of the central carrier 4 into said ducted fan with said stator.

Each of said rotor blades 5 is mounted by means of a rotational ball borne support for pitch with torsional spring or a flex-beam 6 with an inner end to the central carrier 4. The rotor blades 5 extend radial from said central carrier 4 with tips 7 towards the circular open stator at an inner circumference 8 of the ducted fan in the shroud 2. Said tips 7 are respectively per rotor blade 5 provided with two permanent magnets 13, 14 separate in direction of the axis of rotation $y_F$.

A plurality of electro magnets 9 of the circular open stator are provided coaxially with the central carrier 4. Said electro magnets 9 are each integrated along the inner circumference 8 of the shroud 2 encompassing the separate permanent magnets 13, 14 at the tips 7 of the rotor blades 5 without obstructing free rotation of the rotor blades 5.

The electro magnets 9 with the separate permanent magnets 13, 14 provide as many linear motors as permanent magnets are provided.

Figure 2:
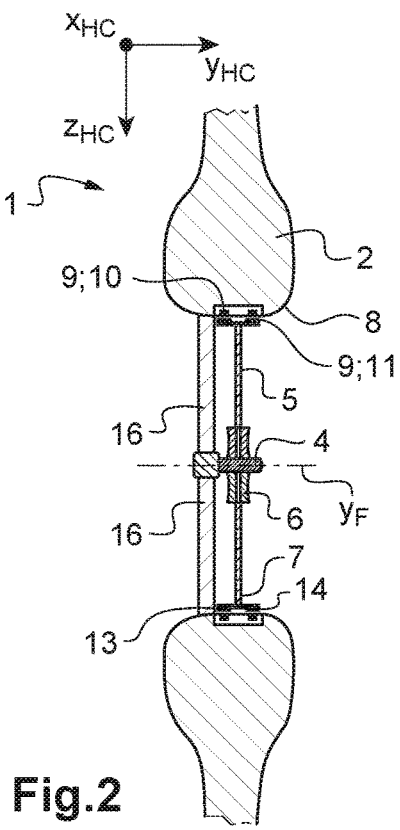

According to FIG. 2 corresponding features are referred to with the same references as in FIG. 1. The shroud 2 of the rotor drive system 1 with a ducted fan comprises the in direction of the axis of rotation $y_F$ circular open stator. Inside the circular open stator is the rotor with the rotatable central carrier 4 and the rotor blades 5 distributed around the central carrier 4 in the essentially one plane perpendicular to the axis of rotation $y_F$. The rotatable central carrier 4 is mounted with unilateral radial struts 16 into said ducted fan with said stator.

Each of said rotor blades 5 is mounted by means of a rotational ball borne support for pitch with torsional spring or a flex-beam 6 with the inner end to the central carrier 4. The rotor blades 5 extend radial from said central carrier 4 with tips 7 towards the inner circumference 8 of the ducted fan in the shroud 2. Said tips 7 are respectively per rotor blade 5 provided with two permanent magnets 13, 14 separate in direction of the axis of rotation $y_F$.

The electro magnets 9 of the circular open stator are aligned along the inner circumference 8 of the ducted fan in the shroud 2 in two essentially parallel rows 10, 11.

Figure 3:
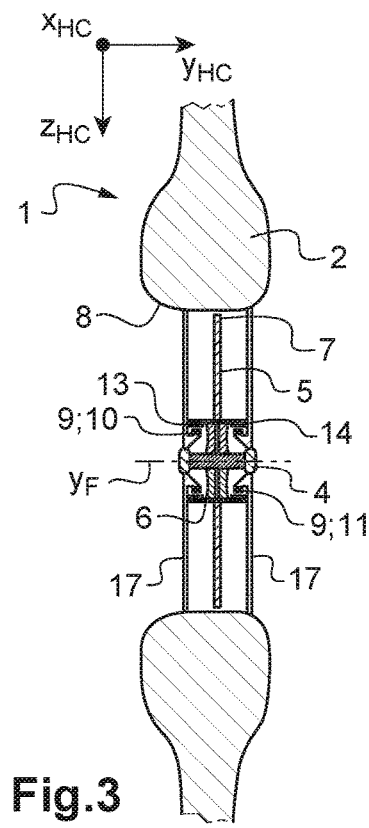

According to FIG. 3 corresponding features are referred to with the same references as in FIG. 1, 2. The shroud 2 of the rotor drive system 1 with a ducted fan comprises the in direction of the axis of rotation $y_F$ circular open stator. Inside the circular open stator is the rotor with the rotatable central carrier 4 and the rotor blades 5 distributed around the central carrier 4 in the essentially one plane perpendicular to the axis of rotation $y_F$. The rotatable central carrier 4 is mounted with bilateral radial struts 17 into said ducted fan with said stator.

Each of said rotor blades 5 is mounted by means of the rotational ball borne support for pitch with torsional spring or the flex-beam 6 with the inner end to the central carrier 4. The rotor blades 5 extend radial from said central carrier 4 with tips 7 towards the inner circumference 8 of the ducted fan in the shroud 2. Respectively two permanent magnets 13, 14 per rotor blade 5 are provided at the inner end of each of said rotor blades 5 with separation of said two permanent magnets 13, 14 in direction of the axis of rotation $y_F$.

The electro magnets 9 of the circular open stator are aligned along an outer circumference 8 of the central carrier 4 in two essentially parallel rows 10, 11.

According to FIGS. 4-6 corresponding features are referred to with the same references as in FIGS. 1-3. The plurality of electro magnets 9 are aligned to the respective rows 10, 11 along the inner circumference 8 of the ducted fan in the shroud 2, each with a distance $d_M$ to a middle rotation plane 12 through the radial central axis r of pivoting of each rotor blade 5. The respective rows 10, 11 extend along the inner circumference 8 of the ducted fan in the shroud 2. Each of the electromagnets 9 is individually connected to a phase of electrical supply from coupled individual control units (not shown).

The individual control units supply at least three electromagnets 9 in the vicinity of the permanent magnets 13, 14 with at least three phase power in such a way, that a moving electromagnetic field is created which drives the permanent magnet 13, 14 like in a linear motor. Since the rotor blades 5 are individually controllable, each electromagnet 9 in the vicinity of each rotor blade 5 needs to have an own controller which creates the required magnetic field by controlling the current rating dependent on the rotor position, the actual blade pitch and the commanded forces $F_1$ and $F_2$.

The electro magnets 9 of the respective rows 10, 11 are electrically separate, while allowing mutually at least energy transfer under the control of a common top level controller with three controller levels, namely 1. A top level controller for the whole electrical fan system. The output of the top level controller is input for level 2 blade controllers.

2. A blade controller for control of the interaction of the two linear motors of an individual rotor blade 5 dependent on the inputs of the top level controller. The blade controller commands the magnet controllers of the individual rotor blades 5.

3. The magnet controller manages the time dependent force generated by one linear motor by controlling the associated electromagnets 9 in the vicinity of the two permanent magnets 13, 14.

For each permanent magnet an individual magnet controller is provided for control of the electromagnets 9 in the vicinity of said permanent magnet 13, 14 at a given time to generate a command force $F_1$, $F_2$ to be applied for this permanent magnet 13, 14. The magnet controller is provided with a detector for the pitch of the rotor blade 5 to which the magnet controller is connected to and detector for measurement of the azimuthal position angle ANG.DET (FIG. 1) of the rotor in order to provide control of the magnets depending on the position of the rotor blade 5 relative to the electromagnets 9. Thus each "permanent magnet"—"magnet controller"—"associated electromagnets"—combination can be considered as an individual linear motor.

The two individual linear motors of the two rows 10, 11 on both sides of one rotor blade 5 are then controlled by a higher level controller with as input the pitch and blade force command in combination with the current pitch $\alpha$. The azimuthal position, indicated by the revolution angle $\omega$, is provided by means of an azimuth angle measurement system of the rotor blade 5. The input commands for the blade controllers are again generated by the top level controller which gets as command the required rotor thrust and moments, and the frequency and phase requirements from potential noise and vibration control controllers.

A blade pitch axis with tip 7 of each rotor blade 5 is half way in between said two rows 10, 11 of electro magnets 9. Two permanent magnets 13, 14 are separately attached at the tips 7 of the rotor blades 5 by a magnet-blade connector plate 15. The two permanent magnets 13, 14 are offset from the radial central axis of rotation of each rotor blade 5 in direction of the rotation axis $y_F$ of the rotor to coincide with the respective rows 10, 11 of electro magnets 9 for the provision of electro magnet motors/generators depending from the electrical supply of the three phase alternating current.

Two separate motors of respective permanent magnets 13, 14 and associated electro magnets 9 generate the forces $F_1$ and $F_2$ on each rotor blade 5 of the rotor in circumferential direction $c_F$ with the distance $d_m$ parallel to the rotation plane 12 of the rotor blades 5.

When, in addition to a drive force, the forces $F_1$ and $F_2$ generated by the two separate motors differ, a Motor Moment $M_B = (F_1 - F_2) * d_m$ results about the blade pitch axis of the respective rotor blade 5. Said moment changes the pitch angle $\alpha$ of the rotor blade 5 determined by the torsional stiffness of the flexbeam 6 (see FIG. 4 or 6). When the forces $F_1$ and $F_2$ are equal, the torsional stiffness of the flexbeam 6 holds the rotor blade 5 in its neutral position (see FIG. 5). The pitch angle $\alpha$ of the rotor blade 5 leads to an aerodynamically resulting force $F_B$ (see FIG. 4 or 6) perpendicular to the rotor plane and a Drag force $F_D$ in circumferential direction $c_F$. The sum of forces $F_B$ of all N rotor blades 5 results in the total rotor force $F_y$ in $y_F$ direction with $$F_y = \sum_N F_B.$$

If any aerodynamic pitch moments are taken into account said aerodynamic pitch moments must be added to the Motor Moment $M_B$ with consequent changes of the resulting blade pitch angle $\alpha$.

A blade pitch sensor (not shown) is provided for each rotor blade 5 for active control of the blade pitch angle $\alpha$ by the control units. Said active blade pitch control system corrects any pitch angle offset by an active and preferably individual control of $F_1$ and $F_2$ of each rotor blade 5. An individual blade pitch control comprises the rotor azimuth angle measurement system, which determines the exact blade positions. According to the detected exact positions of the rotor blade 5 the control units supply individually the three phase alternating current to the electromagnets of the concerned rotor blade 5.

Figure 7:
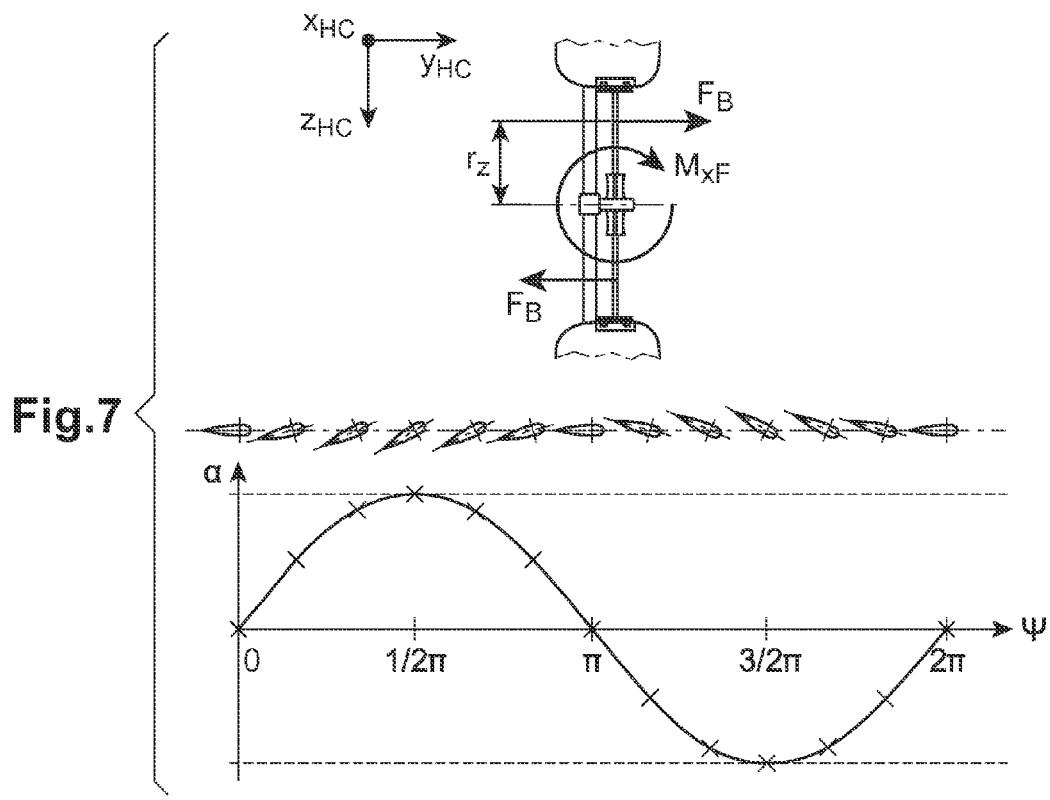

According to FIG. 7 corresponding features are referred to with the same references as in FIGS. 1-6. Along one entire rotation of the rotor each rotor blade moves from the revolution angle $\psi=0°$ to the revolution angle $\psi=360°$ corresponding to $2\pi$. The revolution angle $\psi=0°$ and the revolution angle $\psi=360°$ are aligned on the $x_{HC}$-axis pointing towards the front of the helicopter in forward flight direction. The revolution angle $\psi=90°$ and the revolution angle $\psi=270°$ are aligned on the $z_{HC}$-axis. Respective pitch angles $\alpha$ of one rotor blade 5 along one entire rotation of the rotor from the revolution angle $\psi=0°$ to the revolution angle $\psi=2\pi$ are indicated with the respective revolution angle $\psi$. The pitch angles $\alpha$ of one rotor blade 5 vary from 0° at the revolution angle $\psi=0°$ to a maximum at the revolution angle $\psi=\pi/2$, back to 0° at a revolution angle $\psi=\pi$, again to a maximum at the revolution angle $\psi=3/2\,\pi$ opposed to the maximum at the revolution angle $\psi=\pi/2$ and is back to 0° at the revolution angle $\psi=2\,\pi$, and so on for the next revolutions of the rotor.

A force $F_B$ to each rotor blade 5 is related to each pitch angle of each rotor blade 5 between the revolution angle $\psi=0°$ to the revolution angle $\psi=2\,\pi$. The sum of forces $F_B$ of all rotor blades 5 of the rotor between the revolution angle $\psi=0°$ to the revolution angle $\psi=2\,\pi$ results in the total rotor force in y direction $$F_y = \sum_N F_B.$$

The moment $M_{xF}$ is calculated by summing up the cross products of the forces $F_B$ in Cartesian vector notation and their individual radii of application $r_z$ to the rotor center in vector notation for all blades.

Figure 8:
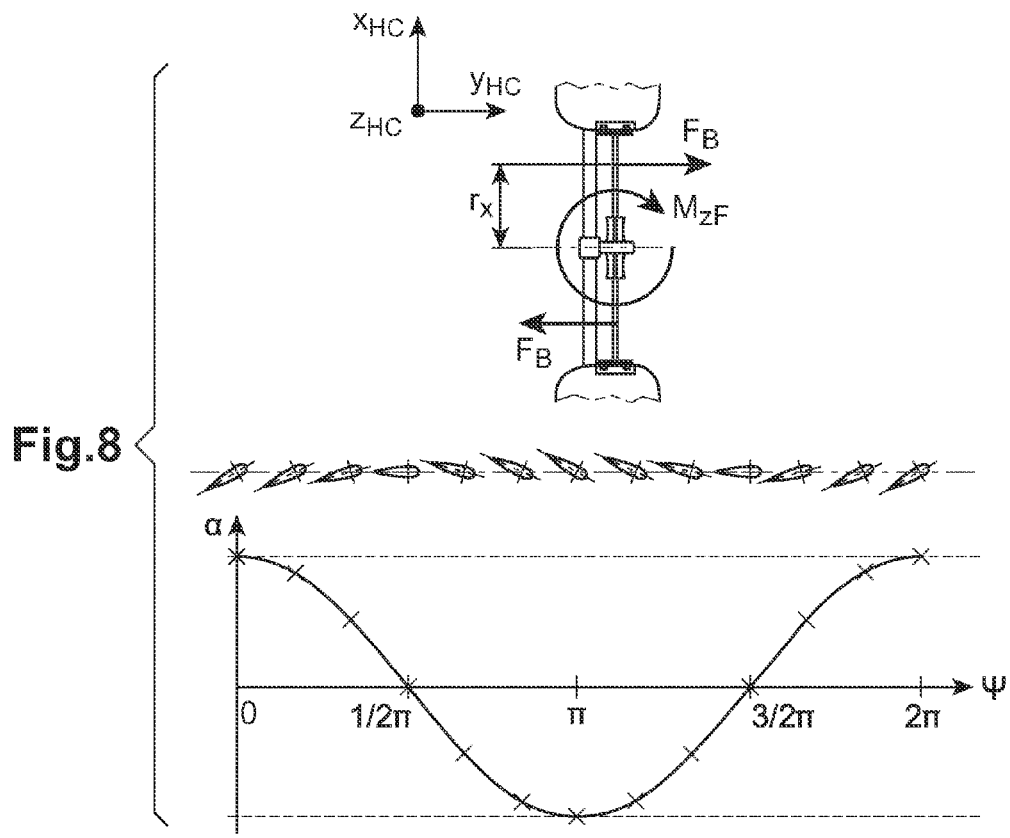

According to FIG. 8 corresponding features are referred to with the same references as in FIGS. 1-7. The pitch angles $\alpha$ of one rotor blade 5 vary from a maximum at the revolution angle $\psi=0°$ to 0° at the revolution angle $\psi=\pi/2$, back to a maximum at the revolution angle $\psi=\pi$ opposed to the maximum at the revolution angle $\psi=0°$, again to 0° at the revolution angle $\psi=3/2\,\pi$ and is back to the maximum of the revolution angle $\psi=0°$ at the revolution angle $\psi=2\,\pi$, and so on for the next revolutions of the rotor.

A force $F_B$ to each rotor blade 5 is related to each pitch angle of each rotor blade 5 between the revolution angle $\psi=0°$ to the revolution angle $\psi=2\,\pi$. The sum of forces $F_B$ of all rotor blades 5 of the rotor between the revolution angle $\psi=0°$ to the revolution angle $\psi=2\,\pi$ results in the total rotor force in y direction $$F_y = \sum_N F_B.$$

The moment $M_{zF}$ is calculated by summing up the cross products of the forces $F_B$ in Cartesian vector notation and their individual radii of application $r_x$ to the rotor center in vector notation for all blades.

Figure 9:
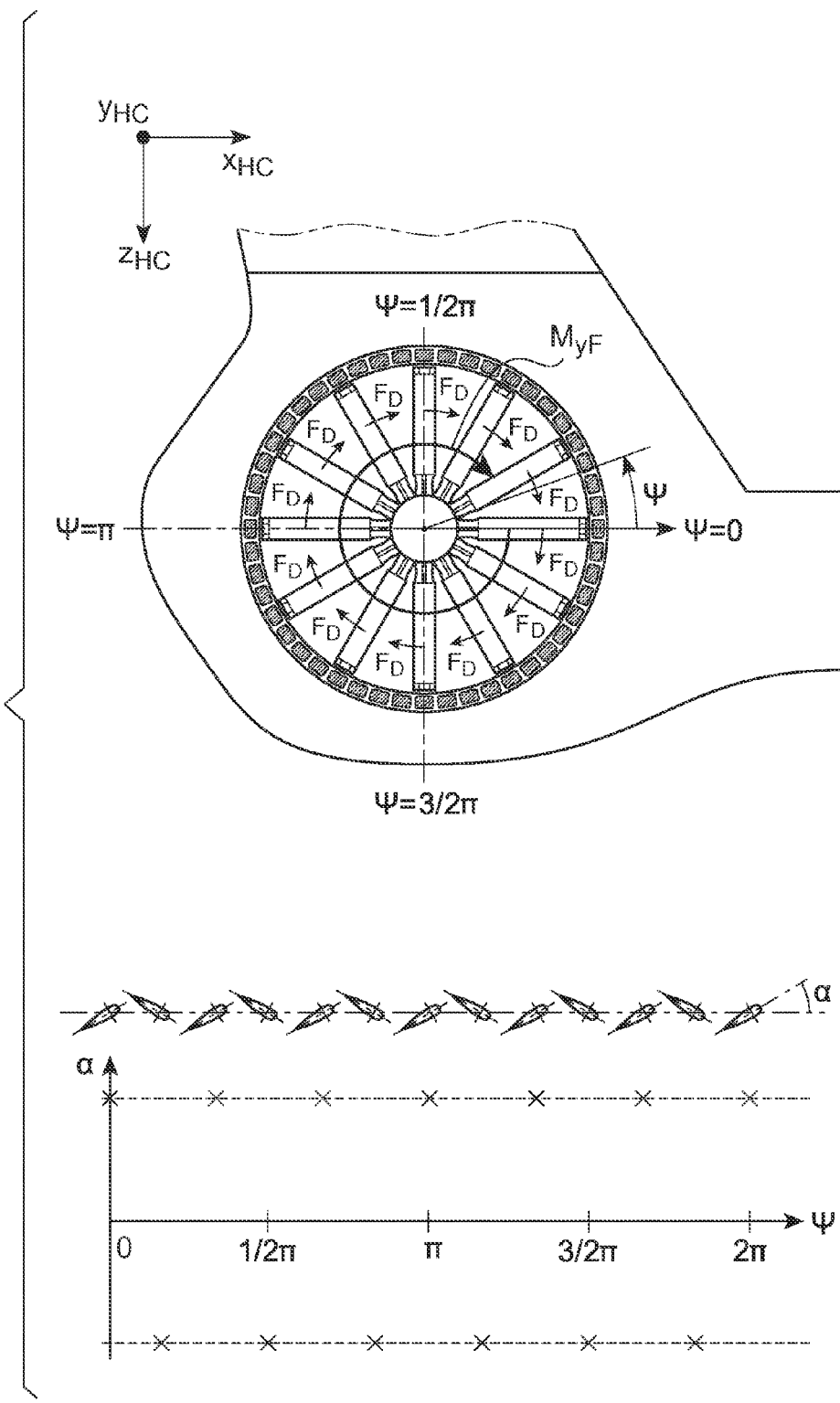

According to FIG. 9 corresponding features are referred to with the same references as in FIGS. 1-8. The pitch angle $\alpha$ of one rotor blade 5 is constantly at a maximum over the whole revolution of the rotor. Each pitch angle $\alpha$ of each respectively next rotor blade 5 in circumferential direction is constantly at a maximum opposed to the pitch angle $\alpha$ of the one rotor blade 5 over the whole revolution of the rotor. Thus all of the rotor blades 5 are fixed in alternately opposed maxima relative to each other over the whole revolution of the rotor.

A force $F_B$ to each rotor blade 5 related to each pitch angle of each rotor blade 5 is compensated by the force $F_B$ related to the pitch angle of the next rotor blade 5 in circumferential direction between the revolution angle $\psi=0°$ to the revolution angle $\psi=2\,\pi$, while a drag force $F_D$ from each rotor blade 5 results. The moment $M_{yF}$ is calculated by summing up the cross products of the drag forces $F_D$ in Cartesian vector notation and their individual radii of application r to the rotor center in vector notation for all blades.

Figure 10:
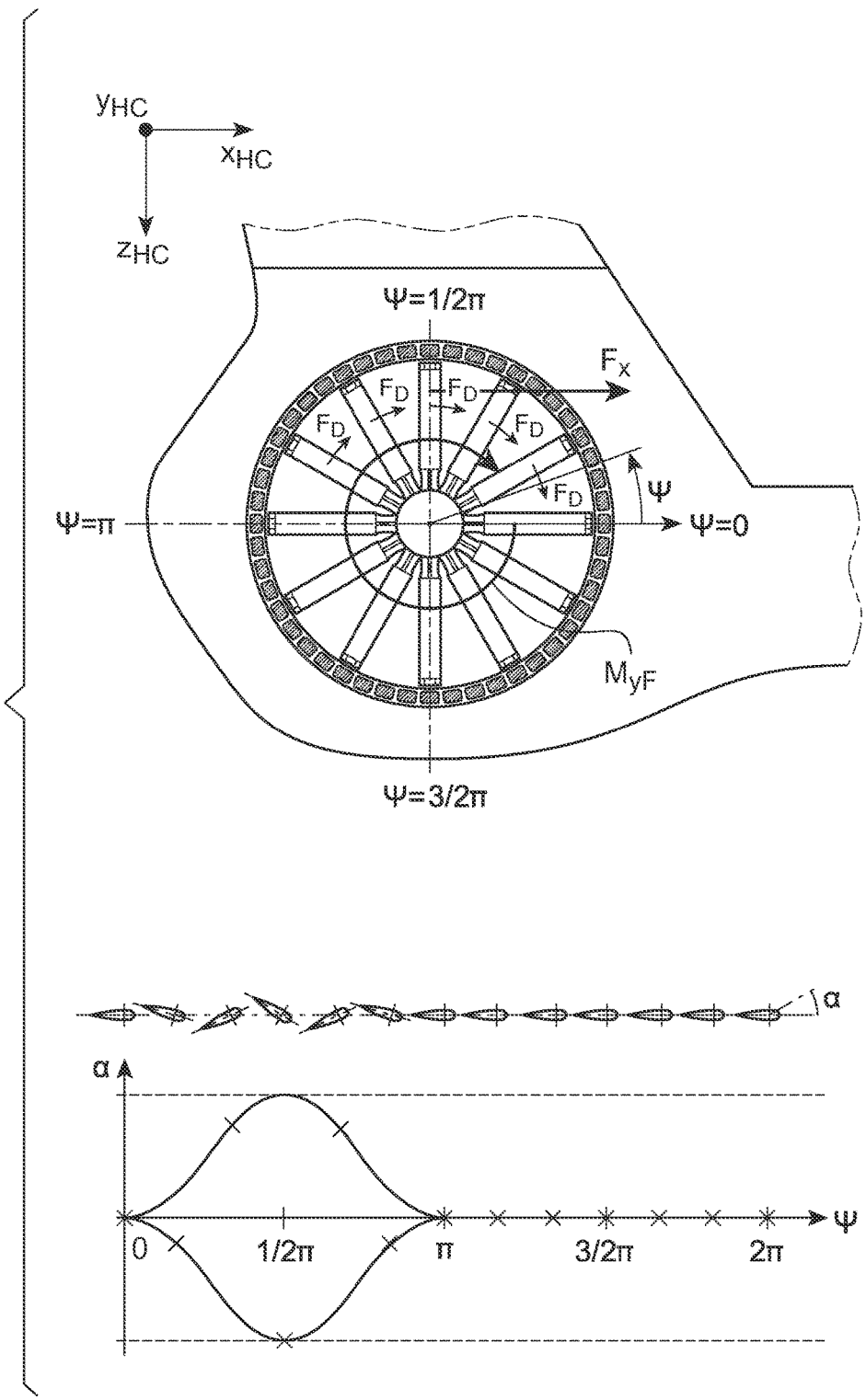

According to FIG. 10 corresponding features are referred to with the same references as in FIGS. 1-9. Pitch angles $\alpha$ of one rotor blade 5 vary continuously from 0° at the revolution angle $\psi=0°$ to a maximum at the revolution angle $\psi=\pi/2$ and back to 0° at a revolution angle $\psi=\pi$. Each pitch angle $\alpha$ of each next rotor blade 5 in circumferential direction between 0° and $\pi$ varies a given revolution angle $\psi$ of the neighbouring rotor blade 5 to the respectively opposite direction. Thus the rotor blades 5 between 0° and $\pi$ in circumferential direction of the rotor move continuously to pitch angles $\alpha$ alternately opposed relative to each other while the rotor blades 5 between $\pi$ and $2\,\pi$ stay respectively in neutral position. The variation of the pitch angles $\alpha$ of the one rotor blade 5 is shown with one curve of the diagram of FIG. 10 while the variation of the pitch angles $\alpha$ of each next rotor blade 5 in circumferential direction is shown with the opposed curve of said diagram.

A force $F_B$ to each rotor blade 5 related to each pitch angle $\alpha$ of each rotor blade 5 is compensated by the force $F_B$ related to the pitch angle $\alpha$ of the next rotor blade 5 in circumferential direction between the revolution angle $\psi=0$ to the revolution angle $\psi=2\,\pi$, while a drag force $F_D$ from each rotor blade 5 results. The drag forces $F_D$ are just generated between the revolution angle $\psi=0$ and angle $\psi=\pi$. Consequently the part of any circumferential drag force $F_D$ which acts in $x_{HC}$ direction between angle $\psi=0$ and angle $\psi=\pi$ is not compensated by an equivalent force between angle $\psi=\pi$ and angle $\psi=2\,\pi$, which leads in total to a force $F_x$ in $x_{HC}$ direction.

Figure 11:
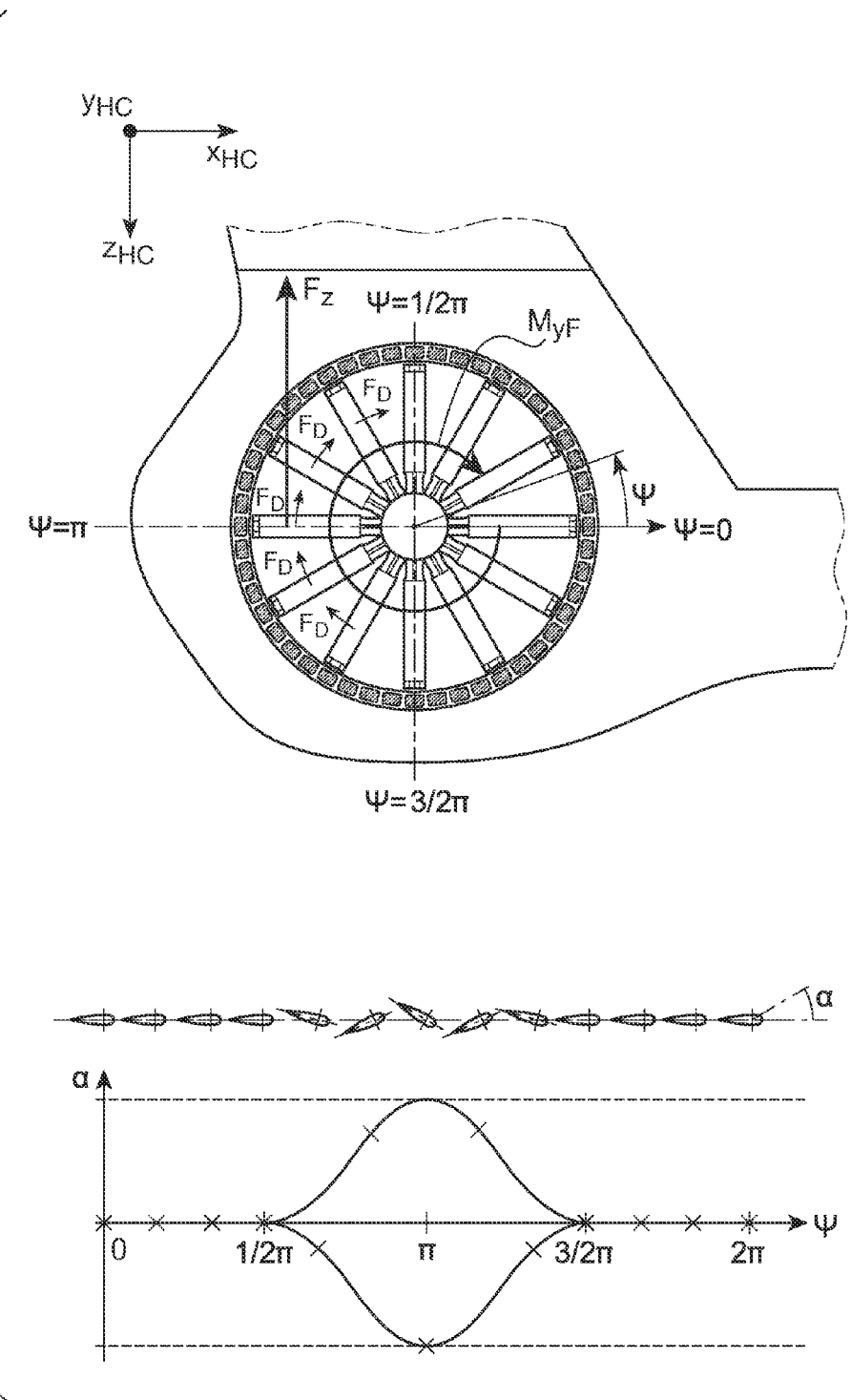

According to FIG. 11 corresponding features are referred to with the same references as in FIGS. 1-10. Pitch angles $\alpha$ of one rotor blade 5 vary from 0° from the revolution angle $\psi=\pi/2$ to a maximum at the revolution angle $\psi=\pi$ and back to 0° at a revolution angle $\psi=3/2\,\pi$. Each pitch angle $\alpha$ of each next rotor blade 5 in circumferential direction varies a given revolution angle $\psi$ to the respectively opposite direction. Thus the rotor blades 5 between $\frac{1}{2}\,\pi$ and $3/2\,\pi$ in circumferential direction of the rotor move continuously to pitch angles $\alpha$ alternately opposed relative to each other while the rotor blades 5 between 0° to ½ π and ¾ π to 2 π stay respectively in neutral position. The variation of the pitch angles α of the one rotor blade 5 is shown with one curve of the diagram of FIG. 11 while the variation of the pitch angles α of each next rotor blade 5 in circumferential direction is shown with the opposed curve of said diagram.

A force $F_B$ to each rotor blade 5 related to each pitch angle of each rotor blade 5 is compensated by the force $F_B$ related to the pitch angle of the next rotor blade 5 in circumferential direction between the revolution angle ψ=0 to the revolution angle ψ=2 π, while a drag force $F_D$ from each rotor blade 5 results. The drag forces $F_D$ are just generated between the revolution angle ψ=π/2 and angle ψ=3/2 π. Consequently the part of any circumferential drag force $F_D$ which acts in $z_{HC}$ direction between angle ψ=π/2 and angle ψ=3/2 π is not compensated by an equivalent force between angle ψ=3/2 π and angle ψ=π/2, which leads in total to a force $F_z$ in $z_{HC}$ direction.

Figure 12:
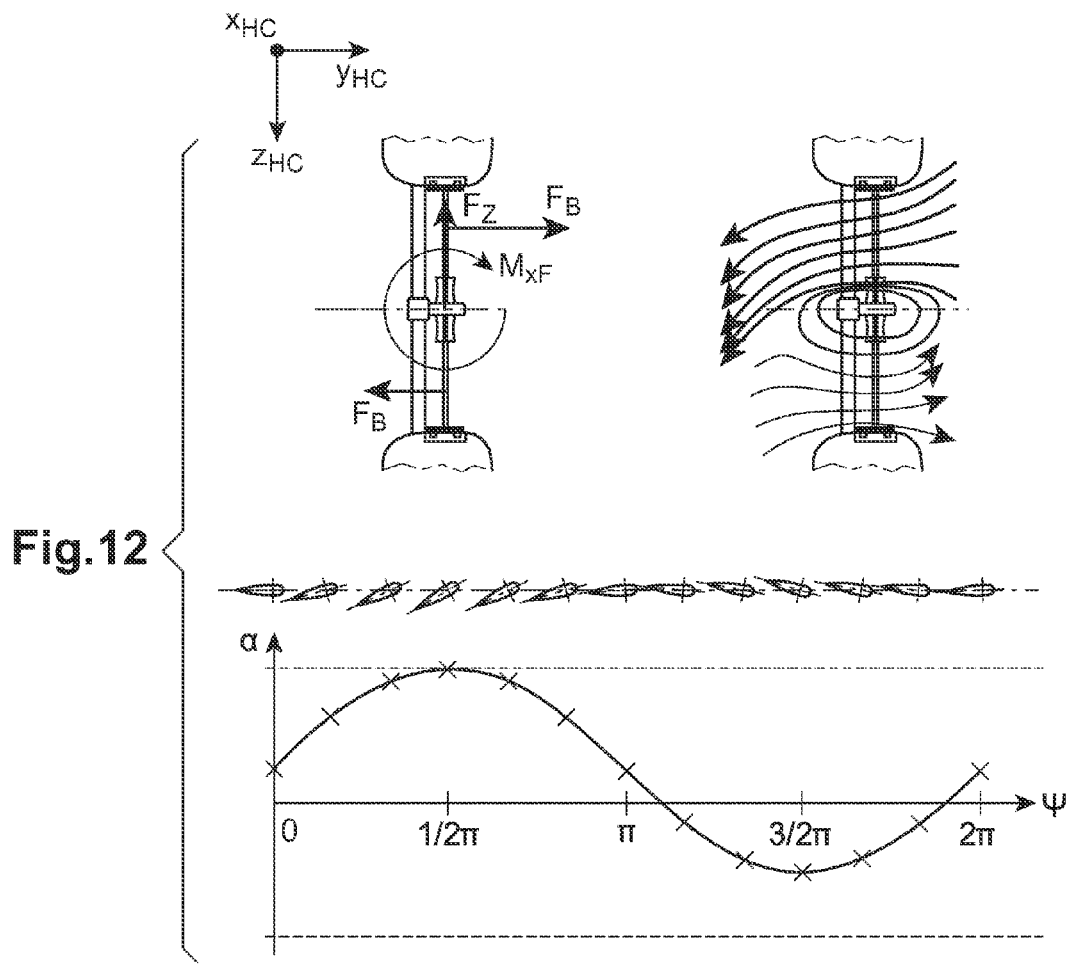

According to FIG. 12 corresponding features are referred to with the same references as in FIGS. 1-11. The pitch angles α of one rotor blade 5 vary between a maximum at the revolution angle ψ=π/2 and a maximum at the revolution angle ψ=3/2 π opposed to and half of the maximum at the revolution angle ψ=π/2 and so on for the next revolutions of the rotor.

Alternatively forces in $x_{HC}$ and $z_{HC}$ direction can be generated by the superposition of a moment generation perpendicular to the rotors rotational axis $y_F$ with an anti-torque-thrust $F_y$. One half of the rotor creates a high thrust in one direction, while the other half creates a low thrust in the other direction. The low thrust flow is used to redirect the high thrust flow, resulting in total in a force $F_z$ in $z_{HC}$-direction. Also a force $F_x$ and again a moment $M_{yF}$ is generated supplemental to a desired force $F_z$ With the respective halves of high thrust and low thrust shifted each with π/2 relative to the pitch angles α shown—a force $F_x$ in $x_{HC}$-direction results correspondingly. Supplemental to the desired force $F_x$, a force $F_z$ and a moment $M_{yF}$ is generated.

Thus the moments $M_{xF}$, $M_{yF}$ and $M_{zF}$ are calculated by summing up the cross products of the forces $F_B$ and $F_D$ in Cartesian vector notation and their individual radii of application $r_F$ (see FIG. 9) to the rotor center in vector notation for all blades. FIG. 12 depicts the generation of a desired force $F_z$.

$$\vec{M}_{xyzF} = \sum_N (\vec{F}_B \times \vec{r}_F), \text{ with } \vec{M}_{xyzF} = \begin{pmatrix} M_{xF} \\ M_{yF} \\ M_{zF} \end{pmatrix},$$

$$\vec{F}_B = \begin{pmatrix} F_{Dx} \\ F_B \\ F_{Dz} \end{pmatrix} \text{ and } \vec{r}_F = \begin{pmatrix} r_{Fx} \\ 0 \\ r_{Fz} \end{pmatrix}.$$

Figure 13:
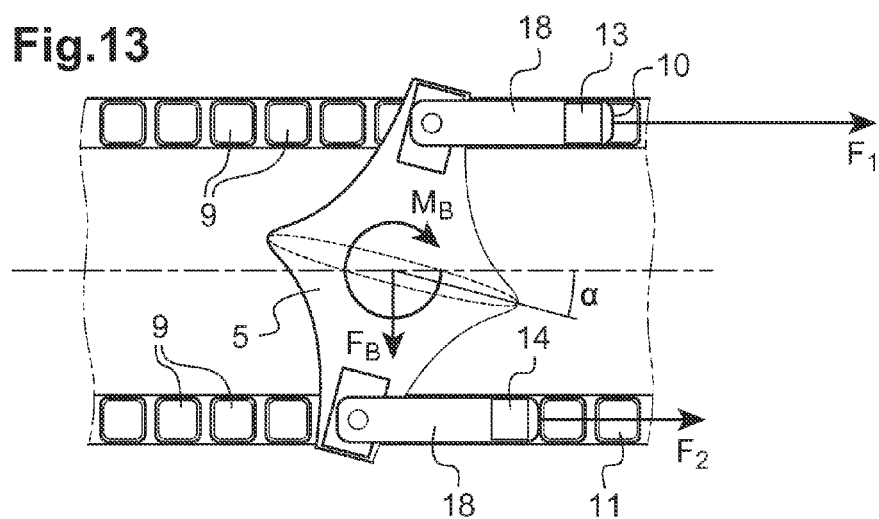

According to FIG. 13 corresponding features are referred to with the same references as in FIGS. 1-12. With pitch variation, the distance of the permanent magnets 13, 14 on the rotor relative to the rotor plane 12 and relative to the electromagnets 9 in the shroud 2 changes, which can lead to a non-optimal location for inductive interaction. A shifting system shifting the electromagnets in $y_{HC}$-direction is provided. Alternatively a width $y_M$ and/or a length $x_M$ of the permanent magnets 13, 14 is increased, so that the permanent magnets 13, 14 cover the electromagnets 9 at all pitch angles α. Or, further alternatively, the permanent magnets 13, 14 are mounted on an end of a lever 18 rotatable relative to an axis parallel to the pitch axis with its hinge at the position of the permanent magnets 13, 14, while a system is provided preventing the permanent magnets 13, 14 to leave the rotational plane 12 of the electromagnets 9.

The rotor drive system 1 can be used to control blade pitch in any thrust generating rotational system or systems which draw power from the movement of the surrounding air like wind turbines.

REFERENCE LIST

1 rotor drive system
2 shroud
3 tail boom
4 rotatable central carrier
5 rotor blades
6 flex-beam
7 tips
8 inner circumference
9 electro magnets
10 row
11 row
12 rotation plane
13 permanent magnet
14 permanent magnet
15 magnet-blade connector plate
16 unilateral radial strut
17 bilateral radial strut
18 lever

What is claimed is:

1. A rotor drive system of a tail rotor of a helicopter, the rotor drive system comprising:
   a stator and a rotor, the rotor being mounted to the stator with a rotatable central carrier and rotor blades radially attached to the rotatable central carrier, the rotor blades defining one rotation plane with a radial central axis of each of the rotor blades and each of the rotor blades being pivotable about their respective radial central axis for variation of blade pitch,
   drive means for the rotor, and
   pitch control means for the pivotable rotor blades wherein along at least one blade radius at least one permanent magnet is fixed on each rotor blade and a plurality of electromagnets on the stator is provided coaxially on at least one stator radius to allow inductive interaction between the plurality of electromagnets and the at least one permanent magnet on each rotor blade, the at least one permanent magnet offset from the radial central axis of each rotor blade in a direction perpendicular to the rotation plane for individual pitch control of each of the rotor blades by individual control of electric supply to each of the electromagnets.

2. The rotor drive system according to claim 1, wherein the stator is a ducted fan, the rotor is mounted radially inside the ducted fan, each of the rotor blades is provided with two electrically separated permanent magnets at a tip of each rotor blade, each of the two electrically separated permanent magnets is fixed offset from the radial central axis in the direction perpendicular to the rotation plane on opposed sides to the rotation plane and the electromagnets are provided along two coaxial, electrically separate rings on an inner circumference of the ducted fan next to the tips, each of the separate rings positioned relative to the permanent magnets on one of the opposed sides to allow electrically separate induction of the permanent magnets on both of the opposed sides of each rotor blade.

3. The rotor drive system according to claim 2, wherein the ducted fan is an anti-torque system for a ducted tail rotor of a helicopter, in a shroud and the drive means for the rotor are the electromagnets of the two coaxial, electrically separate rings on the inner circumference of the ducted fan operated as individually controlled motors.

4. The rotor drive system according to claim 2, wherein the rotatable central carrier is a driven hub and the electromagnets provided along the two separate rings on the inner circumference of the ducted fan are operated as electrically separated generators for supply of power to electric consumers.

5. The rotor drive system according to claim 3, wherein the electromagnets are respectively supplied with three phase alternating current.

6. The rotor drive system according to claim 1, wherein each rotor blade is provided with a magnet blade connector having bilateral ends spaced apart in a direction of rotation with one permanent magnet at each of its bilateral ends, each of the permanent magnets being coincident with the one of the plurality of electromagnets to define at least two separate motors.

7. The rotor drive system according to claim 1, wherein a shifting system is provided for shifting the electromagnets in a $Y_{HC}$-direction.

8. The rotor drive system according to claim 1, wherein the permanent magnets are mounted at the end of a lever rotatable in an axis parallel to a pitch axis wherein the lever is hinged at the permanent magnets.

9. The rotor drive system according to claim 1, wherein the two permanent magnets define individual tips of the rotor blades.

10. A rotor drive system of a tail rotor of a helicopter, the system comprising:
 a shroud defining a circular duct;
 a central carrier mounted in the circular duct;
 a plurality of rotor blades extending radially from the central carrier and rotatable within the circular duct, a rotation plane defined by a radial central axis of each of the rotor blades, each of the rotor blades being pivotable about a respective radial central axis to vary a blade pitch,
 at least one permanent magnet fixed to each of the plurality of rotor blades, and offset from the radial central axis of each blade in a direction perpendicular to the rotation plane; and
 a plurality of electromagnets provided on at least one of the shroud and the central carrier and positioned relative to the at least one permanent magnet to allow inductive interaction between the plurality of electromagnets and the at least one permanent magnet on each rotor blade,
 wherein electric supply to each of the plurality of electromagnets is controlled individually to vary the blade pitch of each of the plurality of rotor blades individually.

11. The rotor drive system according to claim 10, wherein the plurality of electromagnets is defined on an inner circumference of the circular duct and the at least one permanent magnet is positioned at a distal tip of each of the rotor blades.

12. The rotor drive system according to claim 10, wherein the plurality of electromagnets is defined on an outer circumference of the central carrier.

13. The rotor drive system according to claim 10, further comprising:
 two electrically permanent magnets fixed to each of the plurality of rotor blades, each of the two permanent magnets offset from the radial central axis in the direction perpendicular to the rotation plane on opposed sides to the rotation plane,
 two coaxial rings defined by the plurality of electromagnets provided on an inner circumference of the circular duct, each of the two coaxial rings on one of the opposed sides of each rotor blade to allow electrically separate induction of each of the two permanent magnets on both of the opposed sides of each rotor blade.

14. The rotor drive system according to claim 10, wherein the plurality of electromagnets is respectively supplied with three phase alternating current.

15. The rotor drive system according to claim 10, wherein each of the plurality of rotor blades is provided with a magnet blade connector having bilateral ends spaced apart in a direction of rotation with one permanent magnet at each of its bilateral ends, each of the permanent magnets being coincident with the one of the plurality of electromagnets to define at least two separate motors.

* * * * *